(12) United States Patent
Li

(10) Patent No.: US 11,276,101 B2
(45) Date of Patent: Mar. 15, 2022

(54) USER RECOMMENDATION METHOD AND RELATED SYSTEM

(71) Applicants: Shanghai Fusion Management Software Co., LTD., Shanghai (CN); Yan Li, Shanghai (CN)

(72) Inventor: Yan Li, Shanghai (CN)

(73) Assignee: Shanghai Fusion Management Software Co., LTD., Shanghai (CN)

( * ) Notice: Subject to any disclaimer, the term of this patent is extended or adjusted under 35 U.S.C. 154(b) by 248 days.

(21) Appl. No.: 16/335,300

(22) PCT Filed: Sep. 26, 2017

(86) PCT No.: PCT/CN2017/103399
§ 371 (c)(1),
(2) Date: Mar. 21, 2019

(87) PCT Pub. No.: WO2018/068632
PCT Pub. Date: Apr. 19, 2018

(65) Prior Publication Data
US 2020/0020016 A1 Jan. 16, 2020

(30) Foreign Application Priority Data

Oct. 10, 2016 (CN) .......................... 201610883617.1
Jan. 5, 2017 (CN) .......................... 201710008645.3
(Continued)

(51) Int. Cl.
*G06Q 30/00* (2012.01)
*G06Q 30/06* (2012.01)
(Continued)

(52) U.S. Cl.
CPC .......... *G06Q 30/0631* (2013.01); *G06N 5/04* (2013.01); *G06Q 50/01* (2013.01)

(58) Field of Classification Search
CPC ..................................................... G06Q 30/00
See application file for complete search history.

(56) References Cited

U.S. PATENT DOCUMENTS 7,599,938 B1  10/2009 Harrison, Jr.
8,301,692 B1 * 10/2012 Hamaker ........... G06Q 30/0631
709/203
(Continued)

FOREIGN PATENT DOCUMENTS

CN           101937432 A      1/2011
CN           103810192 A      5/2014
(Continued)

OTHER PUBLICATIONS

Bartercard1, Adams, William Lee, "Bartering: Have Hotel, need haircut", Tome, dated Nov. 2009 (Year: 2009).*
(Continued)

*Primary Examiner* — Mark A Fadok
(74) *Attorney, Agent, or Firm* — Honigman LLP; Matthew H. Szalach; Jonathan P. O'Brien

(57) ABSTRACT

A user recommendation method and a related system are provided. In the user recommendation method, combination information from a first user is obtained. A first type of the combination information includes first cluster information and an option control. The option control is one of a first type of option control and a second type of option control. If the combination information from the first user is recognized as being in the first type, the first cluster information of the combination information from the first user is matched with the first cluster information of the combination information from a second user. The option control of the combination information from the second user is different from the option control of the combination information from
(Continued)

the first user. If the matching succeeds, information of the second user is transmitted to the first user.

19 Claims, 7 Drawing Sheets

(30) Foreign Application Priority Data

Mar. 17, 2017 (CN) .......................... 201710167465.X
May 11, 2017 (CN) .......................... 201710331844.8
May 27, 2017 (CN) .......................... 201710395586.X

(51) Int. Cl.
*G06N 5/04* (2006.01)
*G06Q 50/00* (2012.01)

(56) References Cited

U.S. PATENT DOCUMENTS

| | | | |
|---|---|---|---|
| 9,092,744 B2 * | 7/2015 | Tito | .................... G06Q 10/101 |
| 9,721,296 B1 * | 8/2017 | Chrapko | ................ G06N 7/005 |
| 9,740,709 B1 * | 8/2017 | Mawji | ................ G06F 16/9035 |
| 10,331,702 B2 * | 6/2019 | Bilimoria | .............. G06F 16/285 |
| 2013/0166601 A1 * | 6/2013 | Chrapko | ............ G06F 16/9024 |
| | | | 707/798 |
| 2014/0279352 A1 * | 9/2014 | Schaefer | ................ G06Q 40/04 |
| | | | 705/37 |
| 2014/0310121 A1 | 10/2014 | Bhojwani et al. | |
| 2015/0170233 A1 * | 6/2015 | Lisitsa | ............... H05K 7/20309 |
| | | | 705/26.1 |
| 2015/0242497 A1 | 8/2015 | He et al. | |
| 2016/0086231 A1 * | 3/2016 | Darey | ................ G06Q 30/0267 |
| | | | 705/14.64 |
| 2016/0092576 A1 * | 3/2016 | Quercia | ............. G06Q 30/0631 |
| | | | 707/734 |
| 2016/0171514 A1 * | 6/2016 | Frank | ...................... G06Q 30/02 |
| | | | 705/7.29 |
| 2016/0342679 A1 * | 11/2016 | Zhu | ........................ G06Q 50/01 |
| 2017/0060930 A1 * | 3/2017 | Elkherj | .................. G06F 16/25 |
| 2018/0137552 A1 * | 5/2018 | Zhu | ........................ G06F 16/285 |

FOREIGN PATENT DOCUMENTS

| | | |
|---|---|---|
| CN | 104346455 A | 2/2015 |
| CN | 104794656 A | 7/2015 |
| CN | 105989549 A | 10/2016 |
| WO | WO-0109747 A2 | 2/2001 |

OTHER PUBLICATIONS

Bartercard2, Bartercard members trading portal Terms and conditions, members.bartercard.com, dated May 2010. (Year: 2010).*
Bartercard3, "https://web.archive.org/web/20160513171628/http://www.bartercard.com.au/bartercard_international/about.html", Wayback machine, dated May 13, 2016. (Year: 2016).*
Biswajit, Saha, "Complex networks, communities and clustering: A survey", arxiv.org, dated Circa 2015. (Year: 2015).*
State Intellectual Property Office of the P.R. China, International Search Report and Written Opinion for International Application No. PCT/CN2017/103399, dated Jan. 8, 2018.
European Patent Office, Extended EP Search Report for EP Application No. 17860232.2, dated Mar. 2, 2020.

* cited by examiner

USER RECOMMENDATION METHOD AND RELATED SYSTEM

The present application is the national phase application of International Patent Application No. PCT/CN2017/103399 filed on Sep. 26, 2017, which claims priority to: (i) Chinese Patent Application No. 201610883617.1, titled "E-COMMERCE USER RECOMMENDATION METHOD AND SYSTEM", filed on Oct. 10, 2016 with the Chinese Patent Office, (ii) Chinese Patent Application No. 201710008645.3, titled "E-COMMERCE USER RECOMMENDATION METHOD AND SYSTEM", filed on Jan. 5, 2017 with the Chinese Patent Office, (iii) Chinese Patent Application No. 201710167465.X, titled "E-COMMERCE USER RECOMMENDATION METHOD AND SYSTEM", filed on Mar. 17, 2017 with the Chinese Patent Office, (iv) Chinese Patent Application No. 201710331844.8, titled "E-COMMERCE USER RECOMMENDATION METHOD AND SYSTEM", filed on May 11, 2017 with the Chinese Patent Office, and (v) Chinese Patent Application No. 201710395586.X, titled "E-COMMERCE USER RECOMMENDATION METHOD AND SYSTEM", filed on May 27, 2017 with the Chinese Patent Office, which are all incorporated herein by reference in their entireties.

FIELD

The present disclosure relates to the technical field of computer software, and in particular to an internet user recommendation method and a related system.

BACKGROUND

Nowadays, E-commercial companies, such as Taobao and Jingdong, have enormous user groups. Servers of the E-commercial companies publish information of different products. After a user logs into the server, the user inputs tag information of the needed products. The servers may search for the needed products of the user based on the tag information.

However, the function of providing the user with the needed product only based on the tag information by the server of the E-commercial company is not flexible enough to meet growing demands of users.

SUMMARY

In view of the above disadvantages of the conventional technology, a user recommendation method and a user recommendation system are provided according to the present disclosure so as to expand the product matching service of a server of an E-commerce company.

In order to solve the above problems, the following technical solutions are provided.

A user recommendation method is provided, which includes obtaining combination information from a first user. A first type of the combination information includes first cluster information and an option control, the option control is one of a first type of option control and a second type of option control. The method also includes: matching, in a case that the combination information from the first user is recognized as being in the first type, the first cluster information of the combination information from the first user with the first cluster information of the combination information from a second user, where the option control of the combination information from the second user is different from the option control of the combination information from the first user, and transmitting, in a case that the matching succeeds, information of the second user to the first user.

In an embodiment, a second type of the combination information includes first cluster information and an option control, the option control is a third type of option control. The method further includes: matching, in a case that the combination information from the first user is recognized as being in the second type, the first cluster information of the combination information from the first user with the first cluster information of the combination information from a third user, where the option control of the combination information from the third user is the third type of option control, and transmitting, in a case that the matching succeeds, information of the third user to the first user.

In an embodiment, a third type of the combination information includes first cluster information, second cluster information and an option control, the option control is one of a first type of option control and a second type of option control. The method further includes: matching, the first cluster information of the combination information from the first user with the first cluster information of the combination information from a fourth user, and matching the second cluster information of the combination information from the first user with the second cluster information of the combination information from the fourth user in a case that the combination information from the first user is recognized as being in the third type, where the option control of the combination information from the fourth user is different from the option control from the first user, and transmitting, in a case that matching succeeds, information of the fourth user to the first user.

In an embodiment, a fourth type of the combination information includes first cluster information, third cluster information and an option control, the option control is a fourth type of option control. The method further includes: matching, the first cluster information of the combination information from the first user with the third cluster information of the combination information from a fifth user, and matching the third cluster information of the combination information from the first user with the first cluster information of the combination information from the fifth user, in a case that the combination information from the first user is recognized as being in the fourth type, where the option control of the combination information from the fifth user is the fourth type of option control, and transmitting, in a case that the matching succeeds, information of the fifth user to the first user.

In an embodiment, the user recommendation method further includes: in a case that the cluster information from the first user is matched successfully, transmitting information of the first user to a user whose cluster information is matched with the cluster information from the first user.

In an embodiment, the user recommendation method further includes: obtaining one of multiple pieces of combination information designated and pre-stored by the first user; matching the one of the multiple pieces of combination information with the combination information from a sixth user; and transmitting, in a case that the matching succeeds, information of the sixth user to the first user.

In an embodiment, the combination information includes a first layer of combination information and a second layer of combination information. The matching the one of the multiple pieces of combination information with the combination information from a sixth user includes: matching the first layer of combination information of the first user with the second layer of combination information of the sixth user; or matching the second layer of combination information of the first user with the first layer of combination information of the sixth user.

In an embodiment, in a case that the number of pieces of information in the second layer of combination information of the sixth user is more than one. The matching the first layer of combination information of the first user with the second layer of combination information of the sixth user includes: matching the first layer of combination information of the first user with each of the pieces of information in the second layer of combination information of the sixth user.

In an embodiment, the user recommendation method further includes: receiving first request data transmitted by the first user. The first request data is used for requesting to add a friend, and carries an identifier of a friend user and a point value presented to the friend user. The point value presented to the friend user is not less than a threshold of point value set by the friend user. The method further includes transmitting second request data to the friend user based on the identifier of the friend user, where the second request is used for requesting to add a friend, and carries an identifier of the first user and the point value presented to the friend user; and adding, upon receiving response data transmitted by the friend user, the friend user as a friend of the first user, where the response data is used for indicating that the friend user accepts the point value presented to the friend user.

In an embodiment, before the transmitting second request data to the friend user based on the identifier of the friend user, the method further includes: determining whether the number of times of receiving the first request data exceeds a preset value; and if it is determined that the number of times of receiving the first request data does not exceed the preset value, transmitting the second request data to the friend user based on the identifier of the friend user.

In an embodiment, the user recommendation method further includes: receiving communication data transmitted by the first user, where the communication data includes: an identifier of a receiver user of the communication data; determining whether the number of times of transmitting the communication data to the receiver user of the communication data exceeds a preset value, and determining whether response data transmitted by the receiver user of the communication data is received; if it is determined that the number of times of transmitting the communication data to the receiver user of the communication data exceeds the preset value, and it is determined that the response data transmitted by the receiver user of the communication data is not received, transmitting to the first user a prompt message of prohibiting transmission of the communication data; and if it is determined that the number of times of transmitting the communication data to the receiver user of the communication data does not exceed the preset value, or it is determined that the response data transmitted by the receiver user of the communication data is received, transmitting the communication data to the receiver user of the communication data.

In an embodiment, after the obtaining combination information from a first user, the method further includes: matching the combination information from the first user with pre-stored advertisement information based on a matching rule of the option control; and in a case that a piece of advertisement information is successfully matched with the combination information from the first user successfully, transmitting the matched piece of advertisement information to the first user.

A user recommendation device is provided, which includes: a first obtaining unit, a recognition unit, a matching unit, and a transmission unit. The first obtaining unit is configured to obtain combination information from a first user. A first type of the combination information includes first cluster information and an option control. The option control is one of a first type of option control and a second type of option control. The recognition unit is configured to recognize the combination information from the first user. The matching unit is configured to match, in a case that the recognition unit recognizes the combination information from the first user as being in the first type, the first cluster information of the combination information from the first user with the first cluster information of the combination information from a second user, where the option control of the combination information from the second user is different from the option control from the first user. The transmission unit is configured to transmit information of the second user to the first user in a case that the matching unit matches successfully.

In an embodiment, a second type of the combination information includes first cluster information and an option control. The option control is a third type of option control. The matching unit is further configured to match, in a case that the combination information from the first user is recognized as being in the second type, the first cluster information of the combination information from the first user with the first cluster information of the combination information from a third user, where the option control of the combination information from the third user is the third type of option control. The transmission unit is further configured to transmit information of the third user to the first user in a case that the matching unit matches successfully.

In an embodiment, a third type of the combination information includes first cluster information, second cluster information and an option control. The option control is one of a first type of option control and a second type of option control. The matching unit is further configured to match the first cluster information of the combination information from the first user with the first cluster information of the combination information from a fourth user, and match the second cluster information of the combination information from the first user with the first cluster information of the combination information from the fourth user, in a case that the recognition unit recognizes the combination information from the first user as being in the third type, where the option control of the combination information from the fourth user is different from the option control from the first user. The transmission unit is further configured to transmit information of the fourth user to the first user in a case that the matching unit matches successfully.

In an embodiment, the user recommendation device further includes: a second obtaining unit configured to obtain one of multiple pieces of combination information designated and pre-stored by the first user. The matching unit is further configured to match the one of the multiple pieces of combination information with combination information from a sixth user. The transmission unit is further configured to transmit information of the sixth user to the first user in a case that the matching unit matches successfully.

In an embodiment, the user recommendation device further includes a first receiving unit and a friend adding unit. The first receiving unit is configured to receive first request data transmitted by the first user. The first request data is used for requesting to add a friend, and carries an identifier of a friend user and a point value presented to the friend user. The point value presented to the friend is not less than a threshold of point value set by the friend user. The transmission unit is further configured to transmit second request data to the friend user based on the identifier of the friend user. The second request is used for requesting to add a friend, and carries an identifier of the first user and the point value presented to the friend user. The friend adding unit is configured to, upon receiving response data transmitted by the friend user, add the friend user as a friend of the first user, where the response data is used for indicating that the friend user accepts the point value presented to the friend user.

In an embodiment, the user recommendation device further includes a second receiving unit and a determination unit. The second receiving unit is configured to receive communication data transmitted by the first user. The communication data includes an identifier of a receiver user of the communication data. The determination unit is configured to determine whether the number of times of transmitting the communication data to the receiver user of the communication data exceeds a preset value, and determine whether the response data transmitted by the receiver user of the communication data is received. The transmission unit is further configured to transmit to the first user a prompt message of prohibiting transmission of the communication data in a case that the determination unit determines that the number of times of transmitting the communication data to the receiver user of the communication data exceeds the preset value and determines that the response data transmitted by the receiver user of the communication data is not received, and configured to transmit the communication data to the receiver user of the communication data, in a case that the determination unit determines that the number of times of transmitting the communication data to the receiver user of the communication data does not exceed the preset value, or determines that the response data transmitted by the receiver user of the communication data is received.

A server includes a memory configured to store computer programs and a processor configured to execute the computer programs stored in the memory to perform the user recommendation method according to any one of the embodiments described above.

A storage medium is provided, which stores programs. When running on a device installed with the storage medium, the programs control the device to perform the user recommendation method according to any one of the above embodiments.

With the user recommendation method according to the present disclosure, matching is performed on the first cluster information of the combination information from the first user. Therefore the user may input the first cluster information of any kinds, which is not limited to a product label, thereby extending the matching services provided by the server of the E-commerce company to the user. Also, the first cluster information is combined with one of two types of option control, such that the user is allowed to match the first cluster information under the first type of option control or under the second type of option control, thereby extending the manner of matching the first cluster information by the user, and thus extending the application scope of the service of matching the first cluster information provided by the server of the E-commerce company to the user.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

The technical solutions according to the embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments in the present disclosure without any creative work fall into the scope of the present disclosure.

It should be noted that the user recommendation methods according to embodiments of the present disclosure may be applied to a server of an E-commercial company, and may also applied to a server for a social network. The user logs into the server and inputs combination information according to the need of the user. The server receives the combination information inputted by each user and performs pairwise-matching on the combination information. The combination information inputted by each user is used in the searching and matching process performed by the server with respect to the combination information of other users, and also is used in the searching and matching process performed by the server with respect to the combination information of the user.

A process of the server matching the combination information transmitted by a first user is described below. The first user is a user who transmits the combination information to the server. Each of a second user, a third user, . . . , and a sixth user described below is a user who transmits some types of combination information to the server. Terms such as "first" and "second" are only used for distinguishing one user from another user.

Figure 1:
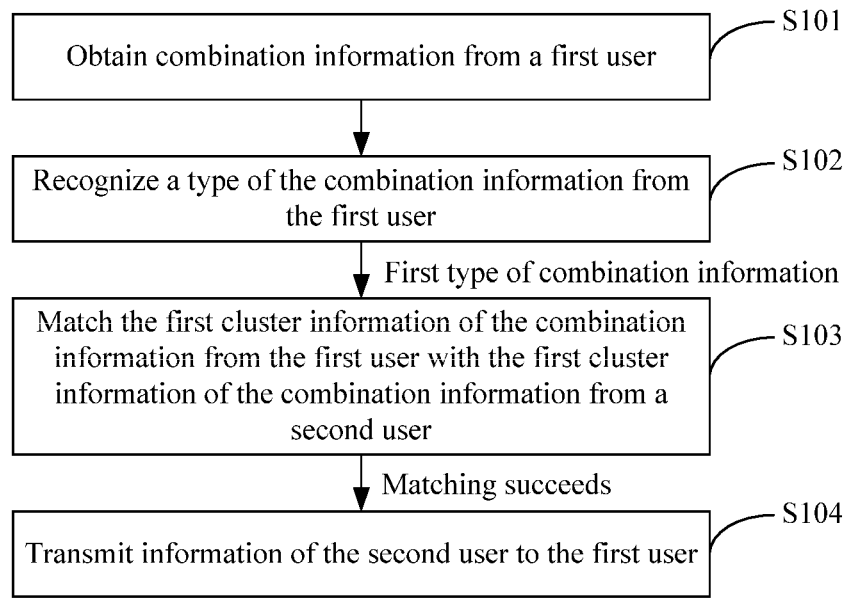
FIG. 1 is a flow chart of a user recommendation method according to an embodiment of the present disclosure.

A user recommendation method is provided according to an embodiment of the present disclosure, as shown in FIG. 1, which includes steps S101 to S104.

In step S101, combination information from a first user is obtained.

The first user logs into a server by a terminal, and inputs the combination information on an input interface of the terminal. A triggering request for user matching is generated and transmitted to the server. After the server receives the triggering request, the server obtains the combination information transmitted by the first user and further starts to match the combination information with combination information inputted by other users.

An input box for cluster information of the combination information and an option button are presented on the input interface of the terminal. The user inputs the cluster information to the input box for the cluster information and inputs option controls by touching the option control button. The user may touch the option controls in an alternative mode, where the option controls are mutually exclusive. That is, for each input of the combination information, only one option control presented on the input interface can be touched to input one type of the option control. The option controls may also be touched in a multi-selection touch mode, where the option controls are not mutually exclusive. That is, one or more option controls presented on the input interface can be touched for each input of the combination information, but the combination information including more than one option controls may be invalid in the server.

In step S102, a type of the combination information from the first user is recognized.

In a case that the combination information from the first user is a first type of combination information, steps S103 and S104 are performed. The first type of combination information includes first cluster information and an option control, where the option control is one of a first type of option control and a second type of option control.

The first user may input different types of combination information based on user own requirement. Specifically, the different types of combination information include different types of data. The first type of combination information includes the first cluster information and the option control, and the option control includes the first type of option control and the second type of option controls which can be selected alternatively.

The first cluster information is information used for performing matching, which may be different information inputted by the user based on the user's own requirement. For example, in a case that the user wants to purchase a product, the first cluster information may be a name or a label of the product. In a case that the user wants to learn a language, the first cluster information is the language. In order to be adaptive to more application scenarios, the first cluster information may also be a pattern or a pattern code that includes a bar code or a two-dimensional code, in this case the user may input the combination information to the server by means of scanning instead of manually inputting.

The option control is used to indicate a requirement of the user on how to processing the first cluster information. The first type of option control and the second type of option control indicate different requirements, which are generally corresponding to each other. For example, the two requirements are supplying and demanding. The supplying indicates that the user can provide tangible resources, assets, occupations, professions, money, projects, or even medical cases of illness, which are represented by intangible information. The demanding indicates that the user needs to acquire the tangible resources, assets, occupations, professions, money, projects, or even medical cases of illness, which are represented by the intangible information. A user who inputs the option control indicating the supplying and a user who inputs the option control indicating the demanding may corresponding to each other, such as, an author and a reader for a book publish, a singer and a listener in the record industry, a doctor and a patient in the health care industry, a teacher and a student in the education industry, a master and an apprentice in the training industry, an investor and an entrepreneur in the venture capital industry, a lawyer and a client in the judicial industry.

The user logs into the server via the terminal, and inputs the first cluster information and the option control on the information input interface of the server. Specifically, the first cluster information inputted by the user may be user-defined information. That is, keywords in the cluster information are inputted by the user without any limitations. In this way, it is ensured that the user inputs the first cluster information based on the user's own needs, even if the needs are very strange. Apparently, in order to facilitate classification of the first cluster information, the first cluster information may also be inputted in a predetermined format. Specifically, all the first cluster information is presented in a pull-down menu or a multi-level menu on the input interface of the server, which can be selected by the user based on the user's own needs. The first cluster information may also be inputted in a manner combining the user-defined information and the system-defined information, that is, the user selects the system-defined information, and inputs the user-defined information based on the user's own needs under the prompts from the system-defined information.

In a case that the first cluster information is inputted in the user-defined mode, the first cluster information may further include numeral information used for indicating a degree related to processing the first cluster information by the user based on the option control. In a case that the user needs to sell a product, the numeral information is a price offered by the user. Moreover, the first cluster information may further include geographic location information of the user.

Optionally, it should be further noted that in a case that the option control in the combination information from the first user indicates supplying, the first cluster information is unmodifiable, and in a case that the option control of the combination information from the first user indicates demanding, the first cluster information is modifiable.

In step S103, the first cluster information of the combination information from the first user is matched with the first cluster information of the combination information from a second user, where the option control of the combination information from the second user is different from the option control from the first user.

The server obtains the first cluster information of the combination information inputted by other users, and matches the first cluster information of the combination information inputted by each of the other users with the first cluster information of the combination information of the first user. In step S103, a user other than the first user is referred to as the second user, and the combination information inputted by the second user is also the first type of combination information, which includes the first cluster information and the option control, and the option control of the second user is different from the option control of the first user. In a case that the number of the second users is more than one, the first cluster information of each of the second users is matched with the first cluster information from the first user.

Figure 2:
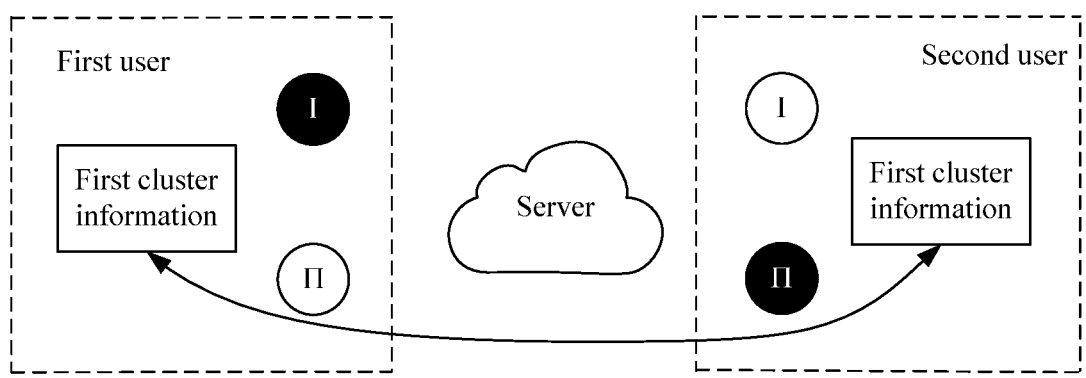
FIG. 2 is a schematic diagram showing a process of matching a first type of combination information according to an embodiment of the present disclosure.

As shown in FIG. 2, the combination information inputted by the first user to the server includes: the first cluster information and the first type of option control. The combination information inputted by the second user to the server includes: the first cluster information and the second type of option controls. Symbols I and II are used for respectively representing the first type of option control and the second type of option control. Apparently, other symbols may be used for representing the two types of option control on the input interface of the server, such as supplying/demanding, positive/negative, +/−, and so on.

Specifically, the server performs similarity degree matching on the first cluster information from the first user and the first cluster information from the second user, thereby determining whether the second user is a user demanded by the first user.

For example, if the first cluster information inputted by the first user is mineral water and the option control is the first type of option control which representing demanding, it indicates that the first user demands for the mineral water. In a case that among the other users who input combination information to the server, there is a second user who inputs the option control as the second type of option control representing the supplying, the similarity degree matching is performed on the first cluster information inputted by the second user and the first cluster information of the first user.

It should be further noted that in a case that the first cluster information inputted by the first user includes numeral information, the server may further set a difference threshold between the numeral information of two corresponding pieces of the first cluster information. The difference threshold may be a fixed value or a proportional value. In this way, the numeral information of the first cluster information of the first user is compared with the numeral information of the first cluster information of the second user, and it is determined whether the difference meets a requirement indicated by the difference threshold. If the difference meets the requirement, the similarity degree matching succeeds. If the difference does not meet the requirement, the similarity degree matching fails.

In a case that the first cluster information inputted by the first user further includes geographical location information, the other users, whose combination information is matched with the first cluster information of the first user, are ranked based on distances between the first user and the other users in an ascending order, and ranking information is also transmitted to the first user.

In a case that the matching succeeds, step S104 is performed, information of the second user is transmitted to the first user.

In a case that the matching succeeds, it indicates that the first cluster information of the first user and the first cluster information of the second user are highly similar, or even the same. In this case, it indicates that the second user is the user demanded by the first user. In this case, the information of the second user is transmitted to the first user, so that the first user obtains the information of the demanded user to make a net-friend or an E-commerce friend.

In a case that the matching fails, it indicates that the second user is not the user demanded by the first user, and the server matches the combined information of the first user with combination information inputted by another second user until the user demanded by the first user is found. If the matching is performed on the combination information of all the users received by the server, and the user demanded by the first user is not found, the prompt information indicating the matching failure is transmitted to the first user.

It should be further noted that if the number of the second users matched successfully in step S103 is more than one, the information of the second users may be transmitted to the first user individually, or the information of the multiple second users may be formed as combined information to be transmitted to the first user. In the above embodiments, in a case that the first cluster information inputted by the second user is also the mineral water, it indicates that the first cluster information of the second user is successfully matched with the first cluster information of the first user.

In the embodiment, the matching is performed on the first cluster information of the combination information from the first user. Therefore, the user may input the first cluster information of any kinds, which is not limited to the label of the product, thereby extending the matching services provided by the server of the E-commerce company for the user. Also, the first cluster information is combined with one of two types of option control, such that the user is allowed to match the first cluster information under the first type of option control or under the second type of option control, thereby extending the manner of matching the first cluster information by the user, and thus extending the application scope of the service of matching the first cluster information provided by the server of the E-commerce company to the user. Also, with this method, the frequency of communication between the user and the server is effectively reduced. Furthermore, the role of the user can be switched by one-click, which also brings great improvement in the user experience.

Optionally, in another embodiment of the present disclosure, in a case that the matching succeeds in step S103, in addition to transmitting the information of the second user to the first user, the information of the first user may also be transmitted to the second user.

In a case that the information of the first user is transmitted to the second user, the second user may also know the user whose combination information is matched with his/her combination information, so that the second user may make a net-friend or an E-commerce friend with the first user.

Figure 3:
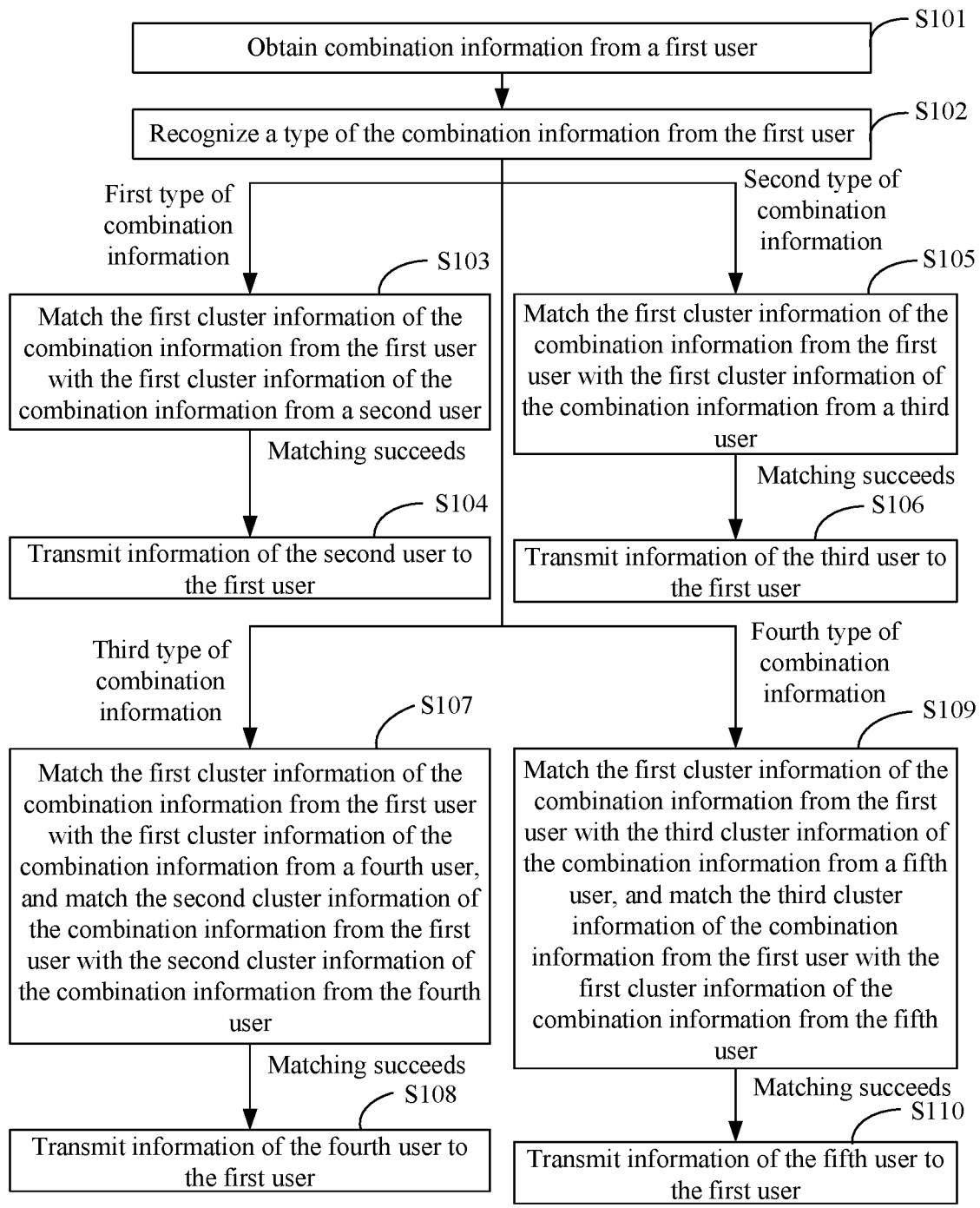
FIG. 3 is a flow chart of a user recommendation method according to another embodiment of the present disclosure.
Figure 4:
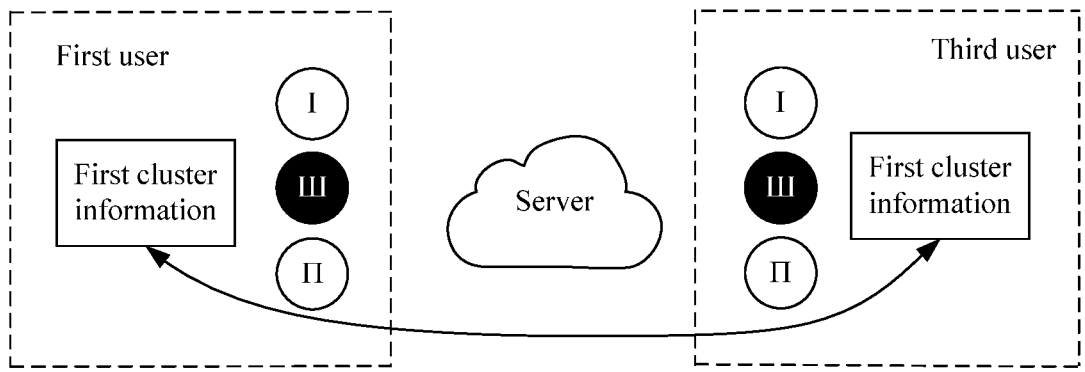
FIG. 4 is a schematic diagram showing a process of matching a second type of combination information according to an embodiment of the present disclosure.

Optionally, in another embodiment of the present disclosure, as shown in FIGS. 3 and 4, in a case that the combination information from the first user is recognized as a second type of combination information in step S102, the method further includes steps S105 and S106 after step S102. The second type of combination information includes first cluster information and an option control, and the option control is a third type of option control.

In step S105, the first cluster information of the combination information from the first user is matched with the first cluster information of the combination information from a third user, where the option control of the combination information from the third user is the third type of option control.

The third type of option control is different from the first type of option control and the second type of option control. The third type of option control may be understood as "same", which is represented as a symbol III in FIG. 4. In the above embodiments, the first type of option control and the second type of option control which have corresponding meanings are generally used in the situation that the first cluster information inputted by the user is used for E-commerce activities. In the present embodiment, the third type of option control is used for social activities. That is, it is determined whether the first cluster information of the first user and the third user indicates the same interest shared by the first user and the third user.

In a case that the matching succeeds, step S106 is performed to transmit information of the third user to the first user.

Optionally, in a case that the matching succeeds in step S105, in addition to transmitting the information of the third user to the first user, the information of the first user may also be transmitted to the third user.

In the embodiment, the first cluster information inputted by the first user is generally information on the social activities, such as an interest or a hobby. In a case that the first cluster information of the first user is similar to or even the same as the first cluster information of the third user, the information of the first user is transmitted to the third user, and the information of the third user is transmitted to the first user. In this case, the first user and the third user may transmit social information to each other based on the information of each other. In the embodiment, the social network is fully integrated into the E-commercial user recommendation method such that the server of the E-commerce company may perform recommendation of the social users.

Figure 5:
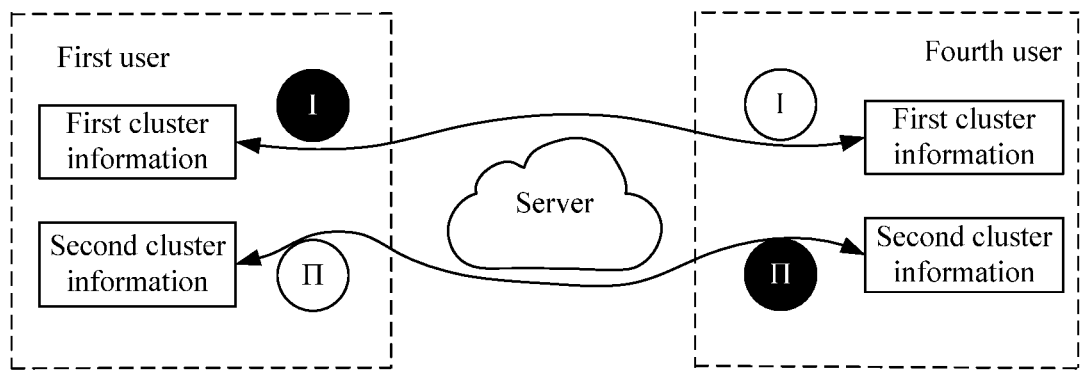
FIG. 5 is a schematic diagram showing a process of matching a third type of combination information according to an embodiment of the present disclosure.

Optionally, in another embodiment of the present disclosure, still referring to FIGS. 3 and 5, in a case that in step S102, the combination information from the first user is recognized as a third type of combination information, the method further includes steps S107 and S108 after step S102. The third type of combination information includes first cluster information, second cluster information and an option control, and the option control is one of a first type of option control and a second type of option control.

In step S107, the first cluster information of the combination information from the first user is matched with the first cluster information of the combination information from a fourth user, and the second cluster information of the combination information from the first user is matched with the second cluster information of the combination information from the fourth user, where the option control of the combination information from the fourth user is different from the option control from the first user.

It should be noted that in the embodiment, the type of the first cluster information of the first user is the same as the type of the first cluster information of the fourth user, and the type of the second cluster information of the first user is the same as the type of the second cluster information of the fourth user. In summary, in this embodiment, the matching is performed on the same type of cluster information of the first user and the fourth user.

The type of the cluster information refers to a meaning of the cluster information, and one of the first cluster information and the second cluster information may be description information of the other cluster information or demand degree information for the other cluster information. The third type of combination information which includes the first cluster information, the second cluster information and the option control, is generally applied in fields of resource exchange, co-founding, mutual assistance of skills and so on. For example, in a case that the first cluster information of the first user is "English teacher", and the second cluster information is "three-year teaching experience", the second cluster information is the description information of the first cluster information. For another example, in a case that the first cluster information of the first user is "nanny", and the second cluster information is "Beijing", the second cluster information is information describing a geographical range corresponding to the first cluster information. For another example, the first cluster information of a user A is "one duck", the second cluster information of the user A is "20 Yuan", the first cluster information of a user B is also "one duck", the second cluster information of the user B is "20 Yuan", and the user A and the user B select different control options. In this case, the relation between the user A and the user B is the typical seller and buyer relation. The information "20 Yuan" is a description of price of one duck. The first cluster information and the second cluster information belong to a same transaction party.

It should be further noted that numeral information in the first cluster information of the first user described above may also be the second cluster information. The two cluster information are used for more accurately describing the requirement of the user.

In a case that the matching succeeds, step S108 is performed to transmit information of the fourth user to the first user.

Optionally, in a case that the matching succeeds in step S107, in addition to transmitting the information of the fourth user to the first user, the information of the first user may also be transmitted to the fourth user.

Figure 6:
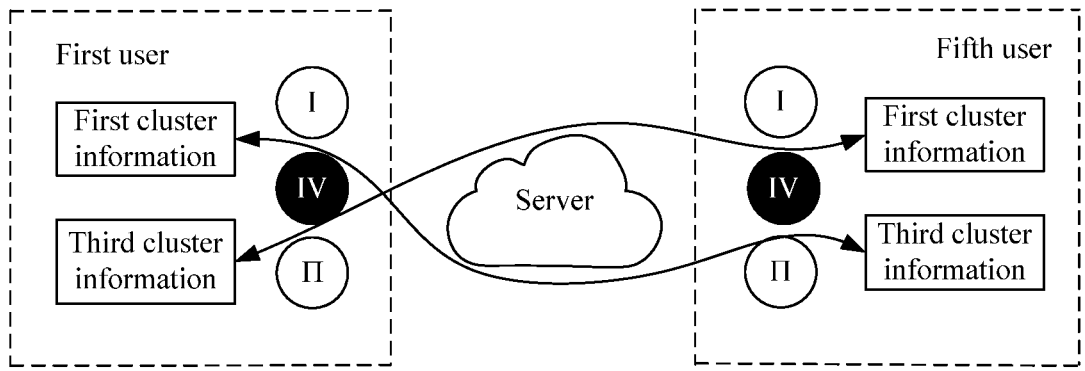
FIG. 6 is a schematic diagram showing a process of matching a fourth type of combination information according to an embodiment of the present disclosure.

Optionally, in another embodiment of the present disclosure, still referring to FIGS. 3 and 6, in a case that the combination information from the first user is recognized as a fourth type of combination information in step S102, the method further includes steps S109 and S110 after step S102. The fourth type of combination information includes first cluster information, third cluster information and an option control, and the option control is a fourth type of option control.

In step S109, the first cluster information of the combination information from the first user is matched with the third cluster information of the combination information from a fifth user, and the third cluster information of the combination information from the first user is matched with the first cluster information of the combination information from the fifth user, where the option control of the combination information from the fifth user is the fourth type of option control.

It should be noted that in the embodiment, the fourth type of option control has a meaning of "exchanging", "combining", "coupling" and so on, which is represent as a symbol "IV" in FIG. 6. In general, there is no relationship between the first cluster information and the third cluster information, both of which are used for representing the supplying/demanding information of the user. One of the first and third cluster information is the information of a thing which can be provided by the user, the other cluster information is the information of a thing needed by the user. Therefore, it is required to match the cluster information inputted by the first user and reflecting the thing that can be provided by the first user with the cluster information inputted by the fifth user and reflecting the thing needed by the fifth user. It is also required to match the cluster information inputted by the first user and reflecting the thing needed by the first user with the cluster information inputted by the fifth user and reflecting the thing which can be provided by the fifth user. That is, the first cluster information and the third cluster information are cross-matched among different users. This cross-matching is also referred to as complementary matching, or coupling matching, that is, the information should be cross-matched in pairs.

The fourth type of combination information described in the embodiment may generally be applied in the fields of resource exchange, barter exchange, money-product exchange, co-founding, mutual assistance of skills and so on. The difference from the embodiment corresponding to FIG. 5 is that, in the present embodiment, there is no relationship between the first cluster information and the third cluster information. Regarding the first example described in the embodiment corresponding to FIG. 5, in the present embodiment, the first cluster information of the first user is "English teacher", and the third cluster information is "fitness instructor". In this case, the combination information inputted by the first user indicates that the first user needs an English teacher, and can provide a fitness training service, or the first user needs the fitness training service, and can provide an English teaching service. In an example that a buyer and a seller use the method according to the present embodiment, the first cluster information and the third cluster information of a user A are "one duck" and "20 Yuan" respectively, the first cluster information and the third cluster information of a user B are "20 Yuan" and "one duck" respectively. Therefore, the cross matching between the users A and B succeeds. This is a typical matching solution for the case of cash for delivery. The "20 Yuan" indicate a price offered for one duck. The first cluster information of one user is the same as the third cluster information of the other user. Compared with the example of duck described above, although the technical solutions are different, they can both achieve the matching between a buyer and a seller.

In addition, it should be further noted that in a case that the first user inputs the fourth type of combination information on the input interface, in order to ensure simplicity of the input interface, the input interface may only present an input box of the first cluster information and the option control and hides the input box of the second cluster information, and then presents the input box of the second cluster information after the first user touches the option control.

In a case that the matching succeeds, step S110 is performed to transmit information of the fifth user to the first user.

Optionally, in a case that the matching succeeds in step S109, in addition to transmitting the information of the fifth user to the first user, the information of the first user may also be transmitted to the fifth user.

Figure 7:
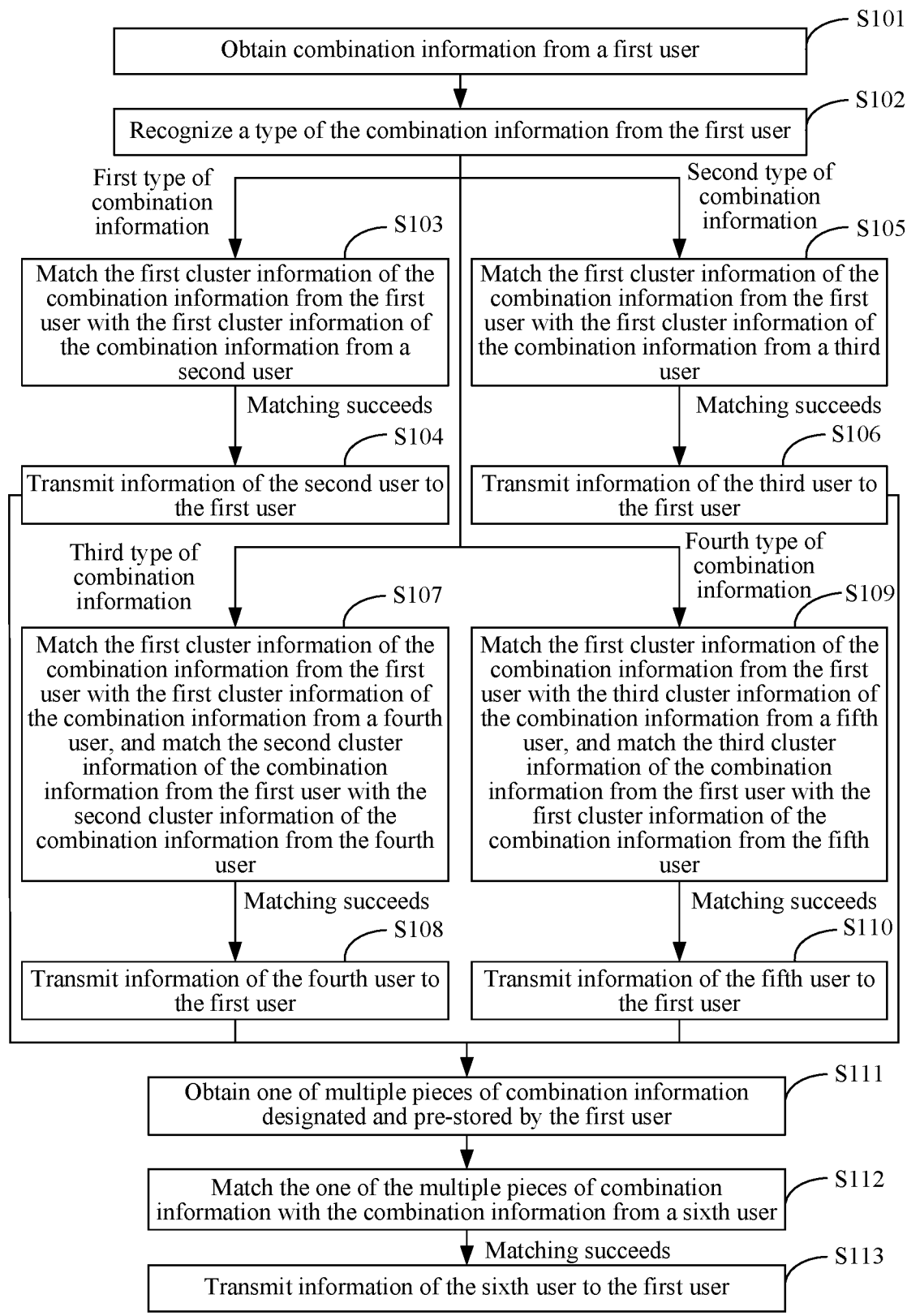
FIG. 7 is a flow chart of a user recommendation method according to another embodiment of the present disclosure.

Optionally, in another embodiment of the present disclosure, still referring to FIG. 7, the user recommendation method further includes steps S111 and S112.

In step S111, one of multiple pieces of combination information designated and pre-stored by the first user is obtained.

The first user pre-stores the multiple pieces of combination information in the server, and directly selects one of the multiple pieces of combination information for performing matching so as to reduce a time for the user to input the combination information. Furthermore, the multiple pieces of combination information stored in advance by the user may include the types of combination information described in the above embodiments.

In step S112, the combination information is matched with combination information from a sixth user.

The combination information selected by the first user is matched with the combination information of each of other users, and in each matching process, the combination information selected by the first user is matched with the combination information of only one user, who is also referred to as a sixth user. In addition, it should be noted that the combination information of the first user also includes the cluster information and the option control. The matching performed on the combination information of the first user means the matching performed on the cluster information and the option control.

Optionally, the combination information selected by the first user includes a first layer of combination information and a second layer of combination information, and the combination information in each of the layers includes cluster information and an option control, and the combination information in each of the layers may be any type of combination information described in the above embodiments.

It should be noted that the first layer of combination information and the second layer of combination information play different roles in the matching. One layer of combination information is used for searching for matched combination information from other users, and the other layer of combination information is used for being searched to match the combination information from another user. Optionally, the first layer of combination information may include a single piece of information and the second layer of combination information may include multiple parallel pieces of combination information. Alternatively, the first layer of combination information may include multiple parallel pieces of combination information and the second layer of combination information may include a single piece of information.

In general, the layer of combination information including a single piece of information is suitable for actively matching with the combination information of other users. The information may be the single information inputted on the input interface of the server by the user, which may be understood as a keyword inputted in a data searching box. The multiple parallel pieces of combination information are suitable for being passively matched with the combination information of another user, which may be understood as existing web information for being searched.

In a case where the combination information selected by the first user includes two layers of combination information, step S112 includes matching the first layer of combination information of the first user with the second layer of combination information of the sixth user, or matching the second layer of combination information of the first user with the first layer of combination information of the sixth user.

It should be noted that matching processes of the two layers of combination information are independent from each other. In addition, the matching processes of the two layers of combination information may be performed sequentially in one matching process or performed respectively in two matching processes.

Optionally, in a case that the number of pieces of information in the second layer of combination information of the sixth user is more than one, the matching the first layer of combination information of the first user with the second layer of combination information of the sixth user includes: matching the first layer of combination information of the first user with each of the multiple pieces of information in the second layer of combination information of the sixth user.

In a case that the matching succeeds, step S113 is performed to transmitted information of the sixth user to the first user.

Optionally, in a case that the matching succeeds in step S113, in addition to transmitting the information of the sixth user to the first user, the information of the first user may also be transmitted to the sixth user.

In a case that the combination information transmitted by the first user includes two layers of combination information, the matching is considered as successful no matter which layer of combination information is successfully matched, and user information of the first user and the user information of the sixth user are transmitted to each other. In addition, in a case that the number of the pieces of information in the second layer of combination information of the sixth user is more than one, the matching is considered as successful as long as one of the multiple pieces of information in the second layer of combination information is matched with the first layer of combination information of the first user.

It should also be noted that in the embodiment, technical solutions disclosed in steps S111 to S113 may be, as shown in FIG. 7, performed after steps S104, S106, S108 or S110, or may be performed in parallel, before or after any one of steps S101 to S110, as long as the server receives the triggering request.

Optionally, in another embodiment of the present disclosure, after step S102, the method may further include matching the combination information from the first user with pre-stored advertisement information based on a matching rule of the option control, and transmitting, in a case that a piece of the advertisement information is successfully matched with the combination information from the first user, the piece of the advertisement information to the first user.

In the embodiment, multiple pieces of advertisement information are pre-stored in the server, and each pieces of advertisement information also includes an option control. Based on the matching rule of the option control, the first cluster information is matched with a content keyword of the advertisement information. In a case that the content keyword of the advertisement information is matched with the cluster information of the combination information from the first user, and the option control of the advertisement information and the option control of the combination information from the first user meet the matching rule of the option control, it indicates that the combination information from the first user is matched with the advertisement information successfully.

It should be further noted that in the embodiment, the matching rule of the option control includes: the combination information including the first type of option control being matched with the advertisement information including the second type of option control, the combination information including the second type of option control being matched with the advertisement information including the first type of option control, the combination information including the third type of option control being matched with the advertisement information including the third type of option control, and the combination information including the fourth type of option control being matched with the advertisement information including the fourth type of option control.

In addition, in a case that the combination information includes two pieces of cluster information, it is also required that the advertisement information to be matched with the combination information includes two pieces of cluster information having the same types as the combination information. For the matching process, references may be made to the embodiments corresponding to FIGS. 5 and 6, which are not repeated herein.

Figure 8:
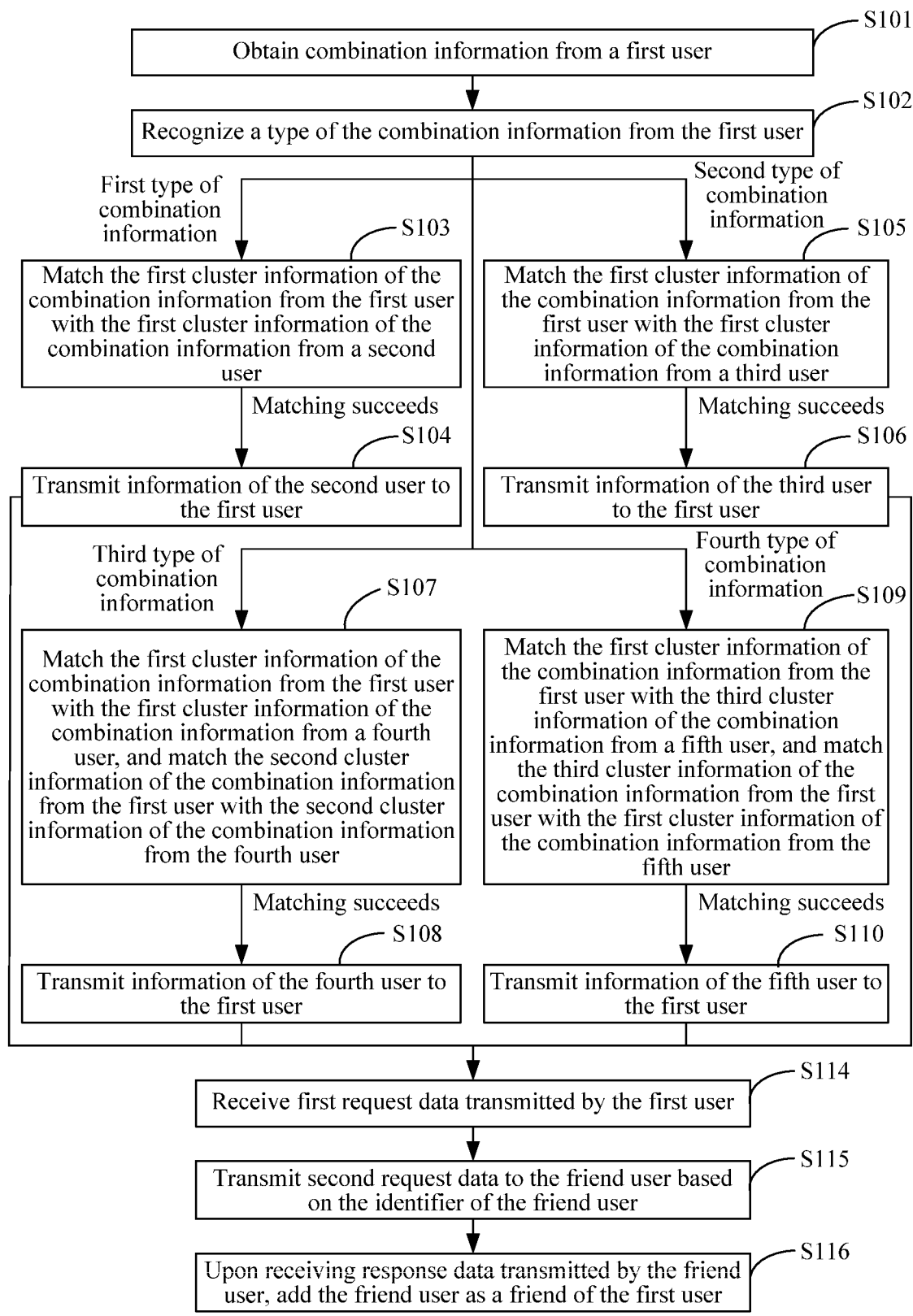
FIG. 8 is a flow chart of a user recommendation method according to another embodiment of the present disclosure.

Optionally, as shown in FIG. 8, in another embodiment of the present disclosure, after the first user obtains the information of the second user, the third user, the fourth user, the fifth user or the sixth user, the first user may make a friend with one or more of them. Specifically, after step S104, S106, S108 or S110, the following steps S114 to S116 may be performed.

In step S114, first request data transmitted by the first user is received. The first request data is used for requesting to add a friend, and carries an identifier of a friend user and a point value presented to the friend user. The point value presented to the friend user is not less than a threshold of point value set by the friend user.

Specifically, the first user acquires the identifier of the user with whom the first user wants to make a friend, based on the information of the second user, the third user, the fourth user, the fifth user or the sixth user. Each of the users may set a threshold of point value for establishing friendship. In a case that the point value presented to the friend user that is carried in the first request data transmitted by the first user is lower than the threshold of point value set by the friend user, the first user may be prompted on the input interface such that the first user changes the point value. Alternatively, the set threshold of point value may be carried in the information of the second user, the third user, the fourth user, the fifth user or the sixth user transmitted to the first user.

In step S115, second request data is transmitted to the friend user based on the identifier of the friend user. The second request is used for requesting to add a friend, and carries an identifier of the first user and the point value presented to the friend user.

In step S116, upon receiving response data transmitted by the friend user, the friend user is added as a friend of the first user, where the response data is used for indicating that the friend user accepts the point value presented to the friend user.

The friend user receives the second request data. In a case that the friend user agrees to establish the friendship, the friend user may receive the point value presented to the friend user, and transmit the response data based on the result. After the first user and the friend user establish the friendship, they may communicate with each other.

Optionally, in another embodiment of the present disclosure, before step S115, the method further includes determining whether the number of times of receiving the first request data exceeds a preset value, and if it is determined that the number of times of receiving the first request data does not exceed the preset value, transmitting second request data to the friend based on the identifier of the friend user.

The preset value may be a fixed value set by the servers or a value adjusted from a default value of the server by the user based on the user's own requirement.

In a case that the first user wants to add a user as a friend, the first user may transmit the first request data to the friend user. In order to prevent the friend user from being disturbed by the first user for many times in the case of not agreeing to the adding friend request, in the present embodiment, before the second request data is transmitted to the friend user, the number of times of transmitting the first request data by the first user is determined, and only in a case that the number of times of transmitting the first request data by the first user is not more than the preset value, the second request data is transmitted to the friend user.

In a case that the number of times of transmitting the first request data by the first user is more than the preset value, the second request data may not be transmitted to the friend user, or prompt information may be transmitted to the first user again to prompt the first user that the number of times of transmitting the first request data is more than the preset value, or prompt the first user that the friend user does not allow the first user to be a friend.

Optionally, in another embodiment of the present disclosure, after the first user acquires the information of the second user, the third user, the fourth user, the fifth user or the sixth user, the first user may perform communication with any one of them. For the communication between the first user and another user, the server may set up a question-answer scheme with automatic interruption. That is, when the communication data of one user is not answered by the other user, the user is not allowed to continue transmitting communication data until the other user make a response to the communication data. The question-answer scheme may be set as one answer for one question, or one answer for multiple questions.

Figure 9:
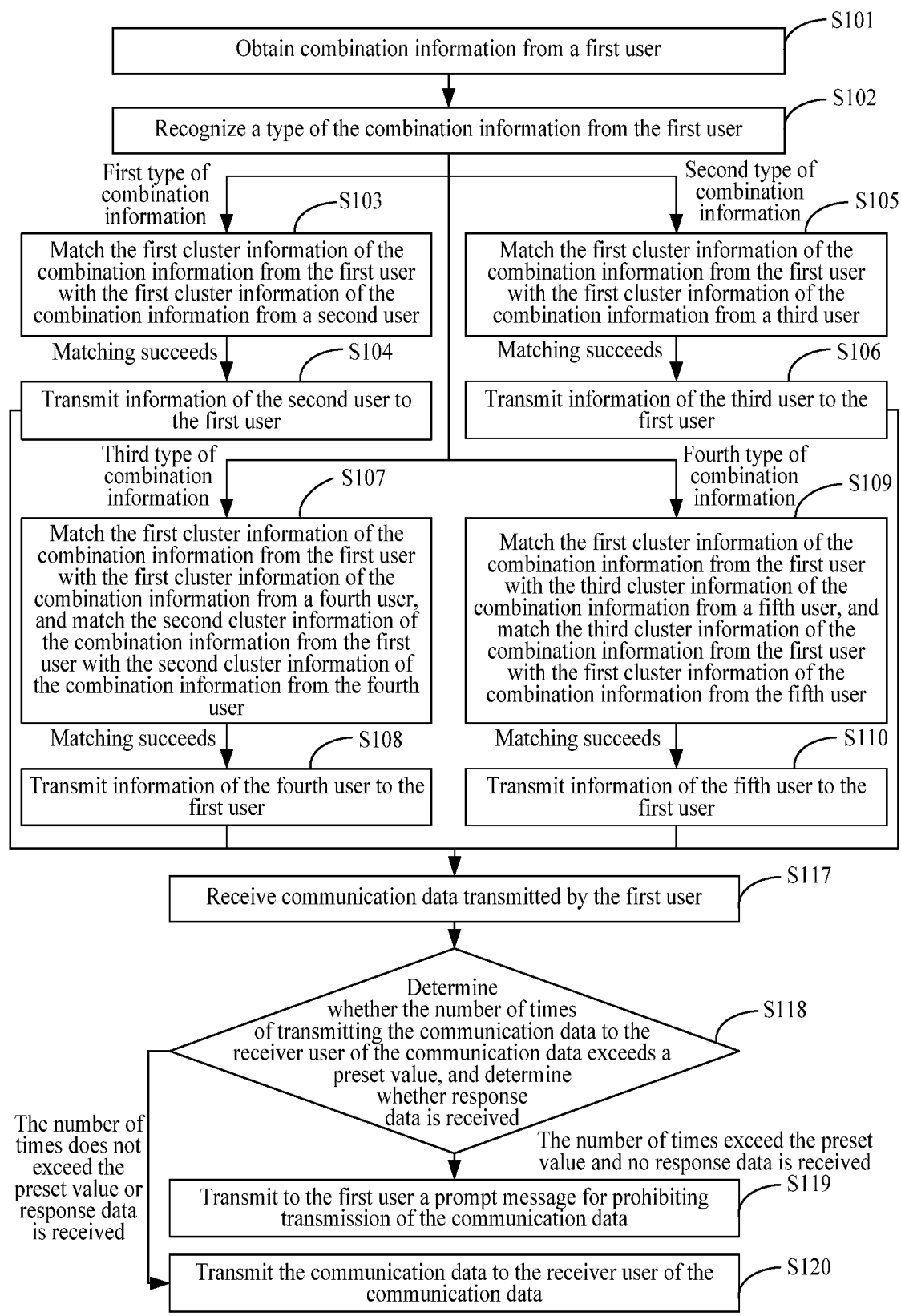
FIG. 9 is a flow chart of a user recommendation method according to another embodiment of the present disclosure.

Specifically, referring to FIG. 9, after step S104, S106, S108 or S110, the following steps S117 to S120 may be performed.

In step S117, communication data transmitted by the first user is received, where the communication data includes an identifier of a receiver user of the communication data.

In step S118, it is determined whether the number of times of transmitting the communication data to the receiver user of the communication data exceeds a preset value, and it is determined whether response data transmitted by the receiver user of the communication data is received.

If it is determined that the number of times of transmitting the communication data to the receiver user of the communication data exceeds the preset value, and the response data transmitted by the receiver user of the communication data is not received, step S119 is performed to transmit a prompt message to the first user for prohibiting transmission of the communication data.

If it is determined that the number of times of transmitting the communication data to the receiver user of the communication data does not exceed the preset value, or it is determined that the response data transmitted by the receiver user of the communication data is received, step S120 is performed to transmit the communication data to the receiver user of the communication data.

After the communication data transmitted by the first user is received, it is determined how many times the communication data is transmitted to the receiver user of the communication data previous to the current transmission of the communication data, that is, the number of transmitting communication data by the first user previous to the current transmission. It is also determined whether the receiver user of the communication data makes a response to communication data transmitted by the first user before the current transmission of the communication data by the first user, that is, whether response data transmitted by the receiver user of the communication data is received.

In addition, the communication data transmitted before the first user transmits the current communication data may be the same as, similar to or even completely different from the current communication data transmitted by the first user.

If it is determined that the number of times of transmitting the communication data to the receiver user of the communication data exceeds the preset value, and it is determined that the response data transmitted by the receiver user of the communication data is not received, it indicates that the receiver user of the communication data is not willing to respond to the communication data of the first user. In order to avoid continuous disturbing of the receiver user of the communication data, the prompt message is transmitted to the first user for forbidding transmission of the communication data. Furthermore, after the prompt message for forbidding transmission of the communication data is transmitted to the first user, no communication data transmitted by the first user will be transmitted to the receiver user of the communication data.

Figure 10:
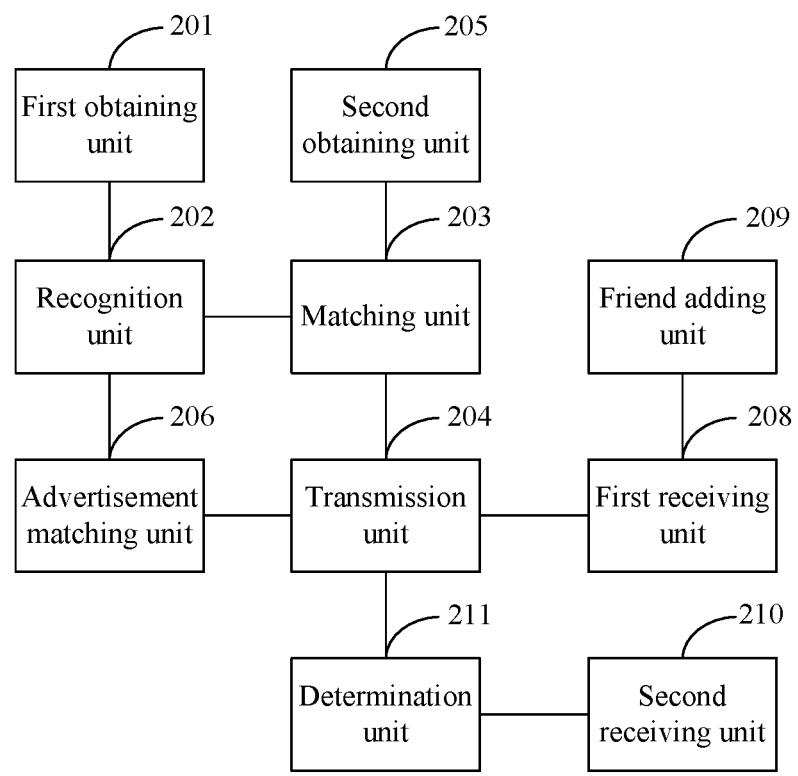
FIG. 10 is a schematic structural diagram of a user recommendation device according to an embodiment of the present disclosure.

As shown in FIG. 10, a user recommendation device is provided according to another embodiment of the present disclosure, which includes a first obtaining unit 201, a recognition unit 202, a matching unit 203 and a transmission unit 204.

The first obtaining unit 201 is configured to obtain combination information from a first user. A first type of combination information includes: first cluster information and an option control, the option control is one of a first type of option control and a second type of option control.

The recognition unit 202 is configured to recognize the combination information from the first user.

The matching unit 203 is configured to match, in a case that the recognition unit recognizes the combination information of the first user as the first type of combination information, the first cluster information of the combination information from the first user with the first cluster information of the combination information from a second user, where the option control of the combination information from the second user is different from the option control of the combination information from the first user.

The transmission unit 204 is configured to transmit information of the second user to the first user in a case that the matching unit 203 matches successfully.

For specific operation processes of the units of the user recommendation device provided according to the embodiment, references may be made to the contents of the method embodiment shown in FIG. 1, which are not repeated herein.

Optionally, in another embodiment of the present disclosure, a second type of combination information includes first cluster information and an option control, the option control is a third type of option control. In a case that the recognition unit 202 recognizes the combination information from the first user as the second type of combination information, the matching unit 203 is further configured to match the first cluster information of the combination information from the first user with the first cluster information of the combination information from a third user, where the option control of the combination information from the third user is the type of third option control. The transmission unit 204 is further configured to transmit information of the third user to the first user in a case that the matching unit 203 matches successfully.

Optionally, in another embodiment of the present disclosure, a third type of combination information includes first cluster information, second cluster information and an option control, and the option control is one of a first type of option control and a second type of option control. In a case that the recognition unit 202 recognizes the combination information from the first user as the third type of combination information, the matching unit 203 is configured to match the first cluster information of the combination information from the first user with the first cluster information of the combination information from a fourth user, and match the second cluster information of the combination information from the first user with the second cluster information of the combination information from the fourth user, where the option control of the combination information from the fourth user is different from the option control from the first user. The transmission unit 204 is configured to transmit information of the fourth user to the first user in a case that the matching unit 203 matches successfully.

Optionally, in another embodiment of the present disclosure, a fourth type of combination information includes first cluster information, third cluster information and an option control, and the option control is a fourth type of option control. In a case that the recognition unit 202 recognizes the combination information from the first user as a fourth type of combination information, the matching unit 203 is configured to match the first cluster information of the combination information from the first user with the third cluster information of the combination information from a fifth user, and match the third cluster information of the combination information from the first user with the first cluster information of the combination information from the fifth user, where the option control of the combination information of the fifth user is the fourth type of option control. The transmission unit 204 is configured to transmit information of the fifth user to the first user in a case that the matching unit 203 matches successfully.

It should be noted that for specific operation processes of the units in the above embodiments, references may be made to the contents of the corresponding method embodiments, which are not repeated herein.

Optionally, in another embodiment of the present disclosure, still referring to FIG. 10, the user recommendation device further includes a second obtaining unit 205.

The second obtaining unit 205 is configured to obtain one of multiple pieces of combination information designated and pre-stored by the first user.

The matching unit 203 is further configured to match the combination information obtained by the second obtaining unit 205 with the combination information from a sixth user.

The transmission unit 204 is further configured to transmit information of the sixth user to the first user in a case that the matching unit 203 matches successfully.

Optionally, the combination information includes a first layer of combination information and a second layer of combination information, the matching unit is specifically configured to match the combination information with the combination information from the sixth user by matching the first layer of combination information of the first user with the second layer of combination information of the sixth user, or matching the second layer of combination information of the first user with the first layer of combination information of the sixth user.

Optionally, in a case that the number of pieces information in the second layer of combination information of the sixth user is more than one, the matching the first layer of combination information of the first user with the second layer of combination information of the sixth user includes: matching the first layer of combination information of the first user with each of the multiple pieces information in the second layer of combination information of the sixth user.

It should be noted that for specific operation processes of the units in the present embodiment, references may be made to the contents of the corresponding method embodiment, which are not repeated herein.

Optionally, in another embodiment of the present disclosure, still referring to FIG. 10, the user recommendation device further includes an advertisement matching unit 206.

The advertisement matching unit 206 is configured to match the combination information from the first user with pre-stored advertisement information based on a matching rule of the option control.

The transmission unit 204 is further configured to transmit, in a case that the advertisement matching unit 206 successfully matches a piece of advertisement information to the combination information from the first user, the matched piece of advertisement information to the first user.

It should be noted that for specific operation processes of the units in the present embodiment, references may be made to the contents of the corresponding method embodiment, which are not repeated herein.

Optionally, in another embodiment of the present disclosure, still referring to FIG. 10, the user recommendation device further includes a first receiving unit 208 and a friend adding unit 209.

The first receiving unit 208 is configured to receive first request data transmitted by the first user. The first request data is used for requesting to add a friend, and carries an identifier of a friend user and a point value presented to the friend user. The point value presented to the friend is not less than a threshold of point value set by the friend user.

The transmission unit 204 is further configured to transmit second request data to the friend user based on the identifier of the friend user, where the second request is used for requesting to add a friend, and carries an identifier of the first user and the point value presented to the friend user.

The friend adding unit 209 is configured to, upon receiving response data transmitted by the friend user, add the friend user as a friend of the first user, where the response data is used for indicating that the friend user accepts the point value presented to the friend user.

It should be noted that for specific operation processes of the units in the present embodiment, references may be made to the contents of the corresponding method embodiment, which are not repeated herein.

Optionally, in another embodiment of the present disclosure, still referring to FIG. 10, the user recommendation device further includes a second receiving unit 210 and a determination unit 211.

The second receiving unit 210 is configured to receive communication data transmitted by the first user, where the communication data includes: an identifier of a receiver user of the communication data.

The determination unit 211 is configured to determine whether the number of times of transmitting the communication data to the receiver user of the communication data exceeds a preset value, and determine whether the response data transmitted by the receiver user of the communication data is received.

The transmission unit 204 is further configured to transmit to the first user a prompt message for prohibiting transmission of the communication data in a case that the determination unit 211 determines that the number of times of transmitting the communication data to the receiver user of the communication data exceeds the preset value, and determines that the response data transmitted by the receiver user of the communication data is not received; and configured to transmit the communication data to the receiver user of the communication data in a case that the determination unit 211 determines that the number of times of transmitting the communication data to the receiver user of the communication data does not exceed the preset value, or determines that the response data transmitted by the receiver user of the communication data is received.

It should be noted that for specific operation processes of the units in the present embodiment, references may be made to the contents of the corresponding method embodiment, which are not repeated herein.

A server is further provided according to another embodiment of the present disclosure, which includes a memory and a processor.

The memory is configured to store computer programs.

The processor is configured to execute the computer programs stored in the memory, to perform the user recommendation method according to any one of the embodiments described above.

A storage medium is provided according to another embodiment of the present disclosure, which stores programs. When running on a device installed with the storage medium, the programs control the device to perform the user recommendation method according to any one of the above embodiments.

In the two embodiments of the server and the storage medium, for specific operation processes of the processor and the device on which the storage medium is installed, references may be made to any one of the method embodiments, which are not repeated herein.

Those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A user recommendation method, comprising:
    obtaining combination information from a first user via an input interface, wherein a first type of the combination information comprises first cluster information and a first option control, the first option control is one of a first type of option control and a second type of option control, the first cluster information is inputted by the first user via a first input box in the input interface, and the first optional control is inputted by the first user via a first option control button in the input interface;
    matching, in a case that the combination information from the first user is recognized as being in the first type, the first cluster information of the combination information from the first user with the first cluster information of the combination information from a second user, wherein the first option control of the combination information from the second user is different from the first option control of the combination information from the first user, wherein the first cluster information of the combination information from the second user is inputted by the second user via the first input box in the input interface, and the first option control of the combination information from the second user is inputted by the second user via the first option control button in the input interface; and
    transmitting, in a case that the matching succeeds, information of the second user to the first user.

2. The method according to claim 1, wherein a second type of the combination information comprises second cluster information and a second option control, the second option control is a third type of option control, the second cluster information is inputted by the first user via a second input box in the input interface, and the second optional control is inputted by the first user via a second option control button in the input interface, the method further comprises:
    matching, in a case that the combination information from the first user is recognized as being in the second type, the second cluster information of the combination information from the first user with the second cluster information of the combination information from a third user, wherein the second option control of the combination information from the third user is the third type of option control, the second cluster information of the combination information from the third user is inputted by the third user via the second input box in the input interface, and the second optional control of the combination information from the third user is inputted by the third user via the second option control button in the input interface; and
    transmitting, in a case that the matching succeeds, information of the third user to the first user.

3. The method according to claim 1, wherein a third type of the combination information comprises first cluster information, second cluster information and an option control, the option control is one of a first type of option control and a second type of option control, the method further comprises:
    matching, in a case that the combination information from the first user is recognized as being in the third type, the first cluster information of the combination information from the first user with the first cluster information of the combination information from a fourth user, and matching the second cluster information of the combination information from the first user with the second cluster information of the combination information from the fourth user, wherein the option control of the combination information from the fourth user is different from the option control from the first user; and
    transmitting, in a case that the matching succeeds, information of the fourth user to the first user.

4. The method according to claim 1, wherein a fourth type of the combination information comprises first cluster information, third cluster information and an option control, the option control is a fourth type of option control, the method further comprises:
    matching the first cluster information of the combination information from the first user with the third cluster information of the combination information from a fifth user and matching the third cluster information of the combination information from the first user with the first cluster information of the combination information from the fifth user, in a case that the combination information from the first user is recognized as being in the fourth type, wherein the option control of the combination information from the fifth user is the fourth type of option control; and
    transmitting, in a case that the matching succeeds, information of the fifth user to the first user.

5. The method according to claim 1, further comprising:
    transmitting, in a case that the cluster information from the first user is matched successfully, information of the first user to a user whose cluster information is matched with the cluster information from the first user.

6. The method according to claim 1, further comprising:
    obtaining one of a plurality of pieces of combination information designated and pre-stored by the first user;
    matching the one of the plurality of pieces of combination information with the combination information from a sixth user; and
    transmitting, in a case that the matching succeeds, information of the sixth user to the first user.

7. The method according to claim 6, wherein the combination information comprises a first layer of combination information and a second layer of combination information, the matching the one of the plurality of pieces of combination information with the combination information from a sixth user comprises:
    matching the first layer of combination information of the first user with the second layer of combination information of the sixth user; or
    matching the second layer of combination information of the first user with the first layer of combination information of the sixth user.

8. The method according to claim 7, wherein in a case that the number of pieces of information in the second layer of combination information of the sixth user is more than one, the matching the first layer of combination information of the first user with the second layer of combination information of the sixth user comprises:
matching the first layer of combination information of the first user with each of the pieces of information in the second layer of combination information of the sixth user.

9. The method according to claim 1, further comprising:
receiving first request data transmitted by the first user, wherein the first request data is used for requesting to add a friend, and carries an identifier of a friend user and a point value presented to the friend user, the point value presented to the friend user is not less than a threshold of point value set by the friend user;
transmitting second request data to the friend user based on the identifier of the friend user, wherein the second request is used for requesting to add a friend, and carries an identifier of the first user and the point value presented to the friend user; and
adding, upon receiving response data transmitted by the friend user, the friend user as a friend of the first user, wherein the response data is used for indicating that the friend user accepts the point value presented to the friend user.

10. The method according to claim 9, wherein before the transmitting second request data to the friend user based on the identifier of the friend user, the method further comprises:
determining whether the number of times of receiving the first request data exceeds a preset value; and
transmitting the second request data to the friend user based on the identifier of the friend user if it is determined that the number of times of receiving the first request data does not exceed the preset value.

11. The method according to claim 1, further comprising:
receiving communication data transmitted by the first user, wherein the communication data comprises an identifier of a receiver user of the communication data;
determining whether the number of times of transmitting the communication data to the receiver user of the communication data exceeds a preset value, and determining whether response data transmitted by the receiver user of the communication data is received;
transmitting to the first user a prompt message of prohibiting transmission of the communication data if it is determined that the number of times of transmitting the communication data to the receiver user of the communication data exceeds the preset value and it is determined that the response data transmitted by the receiver user of the communication data is not received; and
transmitting the communication data to the receiver user of the communication data if it is determined that the number of times of transmitting the communication data to the receiver user of the communication data does not exceed the preset value, or it is determined that the response data transmitted by the receiver user of the communication data is received.

12. The method according to claim 1, wherein after the obtaining combination information from a first user, the method further comprises:
matching the combination information from the first user with pre-stored advertisement information based on a matching rule of the option control; and
transmitting, in a case that a piece of advertisement information is successfully matched with the combination information from the first user, the matched piece of advertisement information to the first user.

13. A user recommendation device, comprising:
a first obtaining unit, configured to obtain combination information from a first user via an input interface, wherein a first type of the combination information comprises first cluster information and a first option control, the first option control is one of a first type of option control and a second type of option control, the first cluster information is inputted by the first user via a first input box in the input interface, and the first optional control is inputted by the first user via a first option control button in the input interface;
a recognition unit, configured to recognize the combination information from the first user;
a matching unit, configured to match, in a case that the recognition unit recognizes the combination information from the first user as being in the first type, the first cluster information of the combination information from the first user with the first cluster information of the combination information from a second user, wherein the first option control of the combination information from the second user is different from the first option control from the first user, wherein the first cluster information of the combination information from the second user is inputted by the second user via the first input box in the input interface, and the first option control of the combination information from the second user is inputted by the second user via the first option control button in the input interface; and
a transmission unit, configured to transmit information of the second user to the first user in a case that the matching unit matches successfully.

14. The device according to claim 13, wherein a second type of the combination information comprises second cluster information and a second option control, the second option control is a third type of option control the second cluster information is inputted by the first user via a second input box in the input interface, and the second optional control is inputted by the first user via a second option control button in the input interface;
the matching unit is further configured to match, in a case that the combination information from the first user is recognized as being in the second type, the second cluster information of the combination information from the first user with the second cluster information of the combination information from a third user, wherein the second option control of the combination information from the third user is the third type of option control, the second cluster information of the combination information from the third user is inputted by the third user via the second input box in the input interface, and the second optional control of the combination information from the third user is inputted by the third user via the second option control button in the input interface; and
the transmission unit is further configured to transmit information of the third user to the first user in a case that the matching unit matches successfully.

15. The device according to claim 13, wherein a third type of the combination information comprises first cluster information, second cluster information and an option control, the option control is one of a first type of option control and a second type of option control;

the matching unit is further configured to match the first cluster information of the combination information from the first user with the first cluster information of the combination information from a fourth user and match the second cluster information of the combination information from the first user with the second cluster information of the combination information from the fourth user, in a case that the recognition unit recognizes the combination information from the first user as being in the third type, wherein the option control of the combination information from the fourth user is different from the option control from the first user; and the transmission unit is further configured to transmit information of the fourth user to the first user in a case that the matching unit matches successfully.

16. The device according to claim 13, further comprising:

a second obtaining unit, configured to obtain one of a plurality of pieces of combination information designated and pre-stored by the first user, wherein the matching unit is further configured to match the one of the plurality of pieces of combination information with combination information from a sixth user; and the transmission unit is further configured to transmit information of the sixth user to the first user in a case that the matching unit matches successfully.

17. The device according to claim 13, further comprising a first receiving unit and a friend adding unit, wherein:

the first receiving unit is configured to receive first request data transmitted by the first user, wherein the first request data is used for requesting to add a friend, and carries an identifier of a friend user and a point value presented to the friend user, the point value presented to the friend is not less than a threshold of point value set by the friend user;

the transmission unit is further configured to transmit second request data to the friend user based on the identifier of the friend user, wherein the second request is used for requesting to add a friend, and carries an identifier of the first user and the point value presented to the friend user; and the friend adding unit is configured to, upon receiving response data transmitted by the friend user, add the friend user as a friend of the first user, wherein the response data is used for indicating that the friend user accepts the point value presented to the friend user.

18. The device according to claim 13, further comprising:

a second receiving unit, configured to receive communication data transmitted by the first user, wherein the communication data includes an identifier of a receiver user of the communication data; and a determination unit, configured to determine whether the number of times of transmitting the communication data to the receiver user of the communication data exceeds a preset value, and determine whether the response data transmitted by the receiver user of the communication data is received, wherein the transmission unit is further configured to transmit to the first user a prompt message of prohibiting transmission of the communication data in a case that the determination unit determines that the number of times of transmitting the communication data to the receiver user of the communication data exceeds the preset value and determines that the response data transmitted by the receiver user of the communication data is not received, and configured to transmit the communication data to the receiver user of the communication data, in a case that the determination unit determines that the number of times of transmitting the communication data to the receiver user of the communication data does not exceed the preset value, or determines that the response data transmitted by the receiver user of the communication data is received.

19. A server, comprising:

a memory, configured to store computer programs; and a processor, configured to execute the computer programs stored in the memory to perform a user recommendation method comprising:

obtaining combination information from a first user via an input interface, wherein a first type of the combination information comprises first cluster information and a first option control, the first option control is one of a first type of option control and a second type of option control, the first cluster information is inputted by the first user via a first input box in the input interface, and the first optional control is inputted by the first user via a first option control button in the input interface;

matching, in a case that the combination information from the first user is recognized as being in the first type, the first cluster information of the combination information from the first user with the first cluster information of the combination information from a second user, wherein the first option control of the combination information from the second user is different from the first option control of the combination information from the first user wherein the first cluster information of the combination information from the second user is inputted by the second user via the first input box in the input interface, and the first option control of the combination information from the second user is inputted by the second user via the first option control button in the input interface; and transmitting, in a case that the matching succeeds, information of the second user to the first user.

* * * * *